United States Patent [19]
Foller et al.

[11] 4,275,755
[45] Jun. 30, 1981

[54] STEAM TRAP

[75] Inventors: Werner Foller, Stuhr; Hermann Symanczyk, Langwedel, both of Fed. Rep. of Germany

[73] Assignee: Gestra-KSB Vertriebsgesellschaft mbH & Co. KG, Bremen, Fed. Rep. of Germany

[21] Appl. No.: 86,965

[22] Filed: Oct. 19, 1979

[51] Int. Cl.³ .............................................. F16T 1/20
[52] U.S. Cl. .................................... 137/195; 137/415; 137/445
[58] Field of Search ............... 137/195, 192, 413, 414, 137/415, 445

[56] References Cited

U.S. PATENT DOCUMENTS

| | | | |
|---|---|---|---|
| 3,599,659 | 8/1971 | Nuter | 137/445 X |
| 3,635,238 | 1/1972 | Hankison | 137/195 |

FOREIGN PATENT DOCUMENTS

| | | | |
|---|---|---|---|
| 26498 | 8/1923 | France | 137/195 |

*Primary Examiner*—Alan Cohan

*Attorney, Agent, or Firm*—Allison C. Collard; Thomas M. Galgano

[57] ABSTRACT

A steam trap is provided having a main locking member disposed in a supply pressure chamber and cooperating with a main valve seat, a pressure chamber provided in the low pressure end and an adjustment member mounted in the pressure chamber which is responsive to the pressure therein, and which is coupled with the main locking member by means of a shaft. The shaft has a control conduit longitudinally extending therethrough coupling the supply pressure end with the pressure chamber. A pilot valve seat is provided on the main locking member at the inlet opening of the control conduit and a pilot locking member is provided which cooperates with the pilot valve seat. An actuating device is provided for the pilot locking member which is controlled by the condensate to be discharged. The steam trap is particularly characterized by the provision of a seat element on which the main valve seat is formed which supports the pressure chamber on a neck member having outflow openings for the condensate. The pressure chamber housing is freely suspended in the low pressure chamber by the neck member.

7 Claims, 2 Drawing Figures

STEAM TRAP

The present invention relates to a steam trap. More particularly, it relates to a steam trap of the type which is mounted between a supply pressure chamber and a low pressure chamber, and which includes a main valve seat disposed between the supply and low pressure chambers, a main locking member disposed in the supply pressure chamber for cooperation with the main valve seat, and a pressure-responsive adjustment member including a shaft and a pilot pressure chamber housing defining a pilot pressure chamber. The actuation member is coupled to the main locking member by means of a shaft, which has a control conduit longitudinally extending therethrough. The conduit has an inlet opening in the main locking member and it serves to establish communication between the supply pressure chamber and the pilot pressure chamber. The steam trap also includes a pilot valve seat provided on the main locking member at the inlet opening of the control conduit, a pilot locking member disposed for cooperation with the pilot valve seat and an actuating device for the pilot locking member, which is controlled by, and responsive to, the condensate to be discharged by the steam trap.

In steam traps of this kind which usually have a float or a thermostatic control member (e.g., a membrane cup), it is common practice, e.g., to provide the pressure chamber in the bottom of the steam trap housing in a specific recess below the seat element in which a pressure actuated adjustment element, preferably a piston, is mounted. This results in expensive housing structures. The same is true when the housing discharge connection is disposed coaxial to the main locking member and the adjustment member, because in this case the pressure chamber must be positioned in the center of the flow conduit.

It is therefore an object of the invention to provide a steam trap of the aforementioned type wherein the control and locking elements may be suitably mounted in a multitude of housing structures without requiring specific parameters with respect to the inner space structure of the housing. Therefore, especially simple and easily made housing structures may be used.

This object of the invention is attained by the provision of a steam trap of the aforementioned type wherein the main valve seat is provided in a seat element which supports the pilot pressure chamber housing on a neck member having outflow openings for the condensate and wherein the pilot pressure chamber housing is freely suspended in the low pressure chamber.

The total control mechanism or device of the steam trap, i.e., seat element, main locking member, pilot pressure chamber with associated control member as well as the pilot locking member and the actuating device, constitutes a unitary complete installation set which exclusively engages the separating wall between the supply pressure end and the low pressure end of the steam trap housing and is mounted therebetween like a commonly known seat ring.

Therefore, no additional specific configurational modifications are required on the steam trap housing for shaping the pilot pressure chamber. Therefore, simple pipelike housing structures may be used without any difficulties, and in conventional housing shapes the chamber spaces in the housing bottoms are eliminated. The installation set or unit may be used without a steam trap housing. The installation unit may be mounted immediately on the discharge opening of a condensate collecting container. Thereby, the pressure chamber housing can freely extend through the discharge opening and into the discharge line of the container.

In a preferred embodiment of the invention, the pressure chamber housing is supported at one end of the neck portion and it has a front face opposing the end of the neck member. The shaft of the adjustment member extends in a stroke movable manner through the front face. This construction results in an attenuation of the stroke movement of the main locking member in a simple manner, avoiding locking noises and pressure shocks.

In an especially advantageous embodiment for guiding the main locking element, a guide element is provided on the seat element concentrically encompassing the main locking element. Preferably, the guide element consists of a ring spaced axially from the main valve seat which is mounted on upwardly extending arms of the seat element adjacent to the main locking member.

In a further desirable embodiment calling for float actuation of the pilot locking member, the pilot locking member is in the shape of a slide and is mounted on a drag lever which substantially extends laterally with respect to the stroke direction of the main locking member and which is actuated by the actuating device. Most advantageously, a pivot lever having a pivot axis at one end thereof extends laterally across the main locking member in the locking position thereof. The drag lever is mounted on the pivot lever at a distance from the pivot axis. The opposite end of the pivot lever is engaged by the actuating device. Relatively large opening forces may be exerted on the pilot locking member, which in this case is a slide or roller slide, when using a small float with even a relatively small space limitation imposed on the transmission mechanism. This is advantageously achieved by providing the main locking member with a laterally extending mounting arm on which the pivot lever is pivotably mounted. Most desirably, the mounting arms consist of a U-shaped bar which is mounted on the main locking member, with its front face resting against the same. The drag lever runs longitudinally in the U-shaped bar while the pivot axis of the pivot lever is mounted in the side plates of the U-shaped bar.

As a reliable safety means in order to prevent accidental rotating of the main locking member and the associated parts, the U-shaped bar is preferably provided with a recess adjacent to the main locking member and a safety pin which is retained on the seat element extends through this recess.

Other objects and features of the present invention will become apparent from the following detailed description, considered in connection with the accompanying drawings, which disclose several embodiments of the invention. It is to be understood, however, that the drawings are designed for the purpose of illustration only, and not as a definition of the limits of the invention.

In the drawings, wherein similar reference characters denote similar elements throughout the several views.

Figure 1:
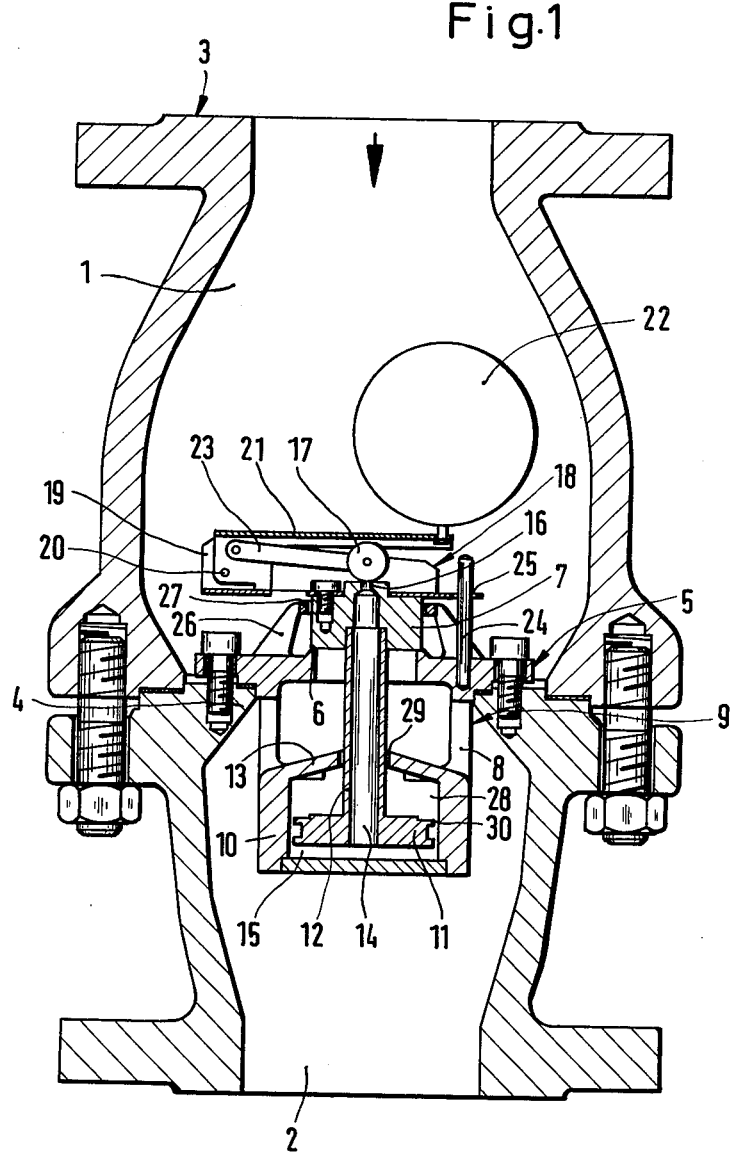
FIG. 1 is a longitudinal sectional view of a steam trap embodying the present invention mounted in a pipe-like housing.

Referring now in detail to the drawings, as can be seen in FIG. 1, a seat element 5 is mounted on a separating wall 4 disposed between the supply pressure chamber 1 and the low pressure chamber 2 of a two-part steam trap housing 3. Seat element 5 is provided with a main valve seat 6 for cooperation with a main locking member 7 which is disposed in supply pressure chamber 2. Seat element 5 extends with a neck member 9, provided with lateral outflow openings 8, into low pressure chamber 2 and supports a freely-suspended pressure chamber housing 10. Housing 10 contains a piston 11 which acts as an adjustment member and which is coupled with main locking member 7 by means of a shaft 12. Shaft 12 in a stroke movable manner extends through the front face 13 of pressure chamber housing 10 facing neck member 9. A control conduit 14 extends through shaft 12 as well as main locking member 7 and piston 11, coupling pressure chamber 15 with supply pressure chamber 1 in the area below piston 11.

At the inlet opening of control conduit 14, main locking member 7 is provided with a pilot valve seat 16 for a pilot locking member 17 which is shaped as a glide or roller slide. On its front face main locking member 7 supports a U-shaped bar 18 which is disposed laterally with respect to the locking stroke direction. In the side plates 19 of U-shaped bar 18, a pivot axis 20 of a pivot lever 21 is mounted radially adjacent to main locking member 7. In a valve locking position, pivot lever 21 extends laterally across main locking member 7 and at its free end engages a float 22. A drag lever 23 is pivotably mounted on pivot lever 21 at a distance from the pivot axis 20 and is disposed longitudinally in the U-shaped bar 18 to control the pilot locking member 17.

A safety pin 24 extends through a recess 25 in the base portion of U-shaped bar 18, disposed laterally from main locking member 7. A ring 27 is provided on upwardly extending arms 26 of seat element 5 and is disposed adjacent main locking member 7, encompassing main locking member 7 as a guide element.

The total control device of the steam trap, i.e., seat element 5, main locking member 7, the guide and rotating safety means 24–27, pressure chamber housing 10 with piston 11, as well as pilot locking member 17 with its associated actuating means 18, 21–23 is a complete, unitary installation unit which engages at one place— namely, separating wall 4 of the steam trap housing 3, on which it is mounted. As previously mentioned, pressure chamber housing 10 extends freely into the low pressure chamber 2. This is advantageous in that the steam trap housing 3, and in particular, the low pressure chamber 2 may be shaped as a simple pipe-like conduit without any inner components for forming the pressure chamber 15, 28.

When main locking member 7 and pilot locking member 17 are in a locked or closed position, the pressure of the low pressure chamber 2 is present in the pressure chamber housing 10 above and below piston 11 due to the throttle ring slots 29, 30 which are disposed between the piston circumference and pressure chamber housing 10, and between shaft 12 and front face 13, respectively. When float 22 is lifted from its rest position in the supply pressure chamber 1 due to condensate collection, the float actuates the pilot locking member 17 by means of the pivot lever 21 and the drag lever 23, as a result of which the pilot locking member 17 is moved laterally away from pilot valve seat 16.

Thereby, the supply pressure is fed from the control conduit 14 into the lower pressure chamber 15. This generates an opening force acting upon piston 11 and, in turn, main locking member 7 which lifts main locking member 7 from main valve seat 6. Thereby, the condensate which has collected in the supply pressure chamber 1 can discharge. When float 22 is lowered to a point which effects a locking or closing of the pilot locking members 16, 17, the pressure in pressure chamber 15 is reduced by means of the throttle ring slots 29, 30 and main locking member 7 resumes its locking or closed position.

The intermediate pressure chamber 28 above piston 11 effects an attenuation of the stroke movement of piston 11 so that shock-like opening and closing actions of main locking member 7 are eliminated; such shock-like actions in steam traps having a large nominal diameter and therefore a large throughput capacity would be very disadvantageous.

Figure 2:
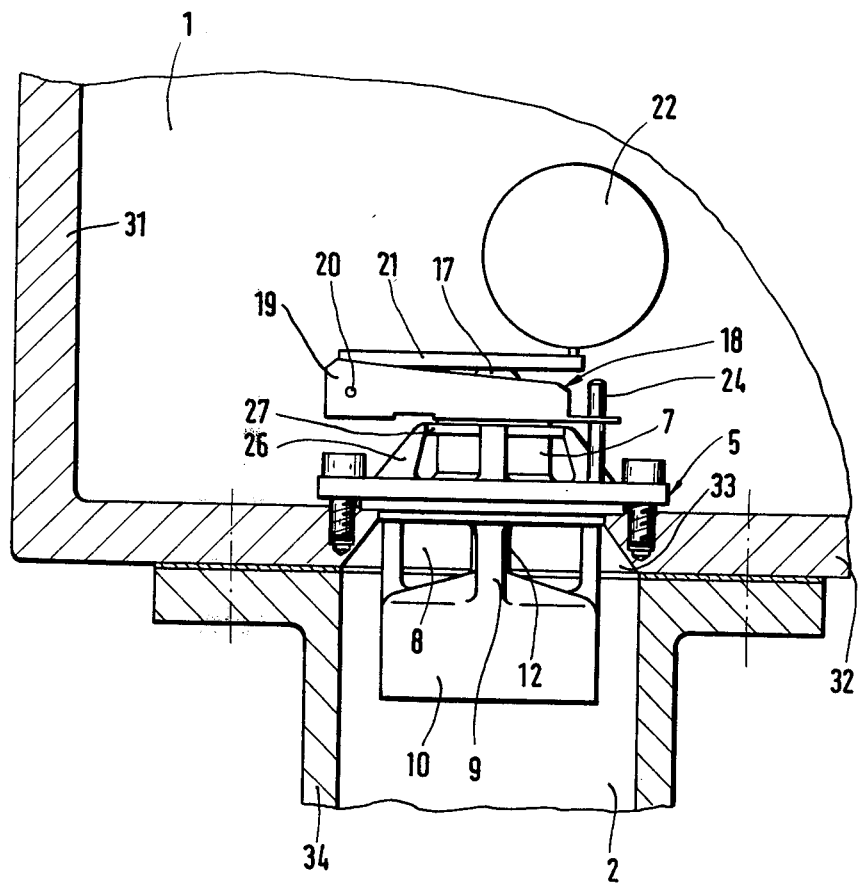
FIG. 2 is a side elevational view of the inventive steam trap without its own housing.

Due to the fact that the total structure of the inventive steam trap constitutes a single installation unit, it is now possible to eliminate a steam trap housing as shown in FIG. 2. As can be seen in this figure, the complete installation unit is immediately installed in a condensate collection container 31. The seat element 5 is mounted on the container bottom 32 and the neck member 9 with pressure chamber housing 10 extends through the outlet opening 33 of the container and into the coupled discharge line 34.

Thus, while only several embodiments of the present invention have been shown and described, it will be obvious that many modifications and changes may be made thereunto, without departing from the spirit and scope of the invention.

What is claimed is:

1. In a steam trap of the type mounted between a supply pressure chamber and a low pressure chamber, and including a main valve seat disposed between said supply and low pressure chambers, a main locking member disposed in said supply pressure chamber for cooperation with said main valve seat, a pilot pressure chamber housing defining a pilot pressure chamber, a pressure-responsive adjustment member disposed in said pilot pressure chamber, said adjustment member being coupled to the main locking member by means of a shaft, said shaft having a control conduit longitudinally-extending therethrough which has an inlet opening in said main locking member and which establishes communication between said supply pressure chamber and said pilot pressure chamber, a pilot valve seat provided on said main locking member at the inlet opening of said control conduit, a pilot locking member disposed for cooperation with said pilot valve seat and an actuating device being controlled by, and responsive to, the condensate to be discharged by said steam trap, the improvement comprising:

said main valve seat being provided in a seat element which supports the pilot pressure chamber housing on a neck member having outflow openings for the condensate and said pilot pressure chamber housing being freely suspended in said low pressure chamber;

said pilot locking member comprising a slide member;

said trap having a pivot lever extending laterally across said main locking member in the locking position thereof and having a fixed pivot axis at one end thereof while the other end thereof is engaged by said actuating device; and said trap having a drag lever which extends substantially laterally with respect to the stroke direction of said main locking member, said drag lever having a first end on which said slide member is mounted and a second end which is pivotably mounted on said pivot lever at a distance from said pivot axis thereof, so that upon actuation by said actuating device, said pivot lever is pivoted about said fixed pivot axis thereof, in turn, effectively causing substantially lateral movement of said drag lever and, consequently, substantially lateral sliding movement of said slide member across and off of said pivot valve seat.

2. The steam trap according to claim 1, wherein said pilot pressure chamber housing is supported at one end of said neck member, wherein said pilot pressure chamber housing has a front face facing said one end of said neck member, and wherein said shaft of said adjustment member extends in a stroke movable manner through said front face.

3. The steam trap according to claims 1 or 2, wherein a guide element is mounted on said seat element concentrically encompassing said main locking member.

4. The steam trap according to claim 3, wherein said guide element consists of a ring spaced axially from said main valve seat and wherein said seat element has upwardly extending arms on which said ring is mounted adjacent to said main locking member.

5. The steam trap according to claim 1, wherein said main locking member is provided with a laterally extending mounting arm on which said pivot lever is pivotably mounted.

6. The steam trap according to claim 5, wherein said mounting arm comprises a U-shaped bar having a front face and a pair of side plates which is mounted on said main locking member with its front face in engagement therewith, and wherein said drag lever runs longitudinally in said U-shaped bar while the pivot axis of said pivot levers is mounted in the side plates of said U-shaped bar.

7. The steam trap according to claim 6, wherein said U-shaped bar has a recess adjacent to said main locking member, and wherein a safety pin is retained on said seat element which extends through said recess.

* * * * *

UNITED STATES PATENT AND TRADEMARK OFFICE
CERTIFICATE OF CORRECTION

PATENT NO. : 4,275,755
DATED : June 30, 1981
INVENTOR(S) : Werner Föller et al

It is certified that error appears in the above-identified patent and that said Letters Patent is hereby corrected as shown below:

On the title page Insert

-- (30) Foreign Application Priority Data
      Nov. 6, 1978      Fed. Rep. of Germany   2848128 --.

Signed and Sealed this

Seventh Day of June 1983

[SEAL]

*Attest:*

DONALD J. QUIGG

*Attesting Officer*    *Acting Commissioner of Patents and Trademarks*